United States Patent [19]

Oudet

[11] Patent Number: 4,714,854
[45] Date of Patent: Dec. 22, 1987

[54] ELECTRIC MOTOR WITH A MULTIPOLAR PERMANENT MAGNET ROTOR

[75] Inventor: Claude Oudet, Besancon, France
[73] Assignee: Portescap, La Chaux-de-fonds, Switzerland
[21] Appl. No.: 880,160
[22] Filed: Jun. 30, 1986
[51] Int. Cl.[4] .......................................... H02K 37/14
[52] U.S. Cl. .................................... 310/268; 310/156
[58] Field of Search ............ 310/156, 266, 268, 49 R, 310/68 R, 162, 254, 46

[56] References Cited

U.S. PATENT DOCUMENTS

| | | | |
|---|---|---|---|
| 4,517,478 | 5/1985 | Oudet | 310/268 |
| 4,518,883 | 5/1985 | Oudet | 310/268 |
| 4,568,862 | 2/1986 | Tassinario | 310/268 |
| 4,658,166 | 4/1987 | Oudet | 310/268 |

FOREIGN PATENT DOCUMENTS 1160490  7/1958  France ................ 310/268

Primary Examiner—Patrick R. Salce
Assistant Examiner—D. L. Rebsch
Attorney, Agent, or Firm—Cushman, Darby & Cushman

[57] ABSTRACT

An electric motor which delivers a high torque per Ampere-turn and a high power rate and acceleration of the rotor. Maximum torque per Ampere-turn is accomplished by setting a minimum air-gap width in the range defined by the relationship $0.389\,P + 1.4 \leq P/E \leq 0.706\,P + 1.85$, with P being the space in millimeters between the centers of the magnetic poles of like polarities of a multipolar permanent magnet arrangement disposed on the rotor and between the centers of regions of minimum width of the air-gap, and E being the width in millimeters of the air-gap. The air-gap refers to the space between opposite parts of permeable magnetic material and thus defines the entire space in which a permanent magnet is placed. In one construction of the invention, the motor comprises a flat annular disk mounted for rotation on a motor shaft, and the stator comprises a plurality of tooth-shaped polar portions facing other polar portions on either side of the annular disk in a direction parallel to the shaft of the disk. The annular disk contains portions of alternating polarity which sequentially pass the tooth-shaped polar portions during rotation of the disk. It is further advantageous to increase the air-gap width E slightly from the inner part to the outer part of the circumference of the annular disk. Thus, the present invention enables small air-gaps and thin permanent magnets to be used to provide very good dynamic characteristics such as power rate and acceleration.

6 Claims, 6 Drawing Figures

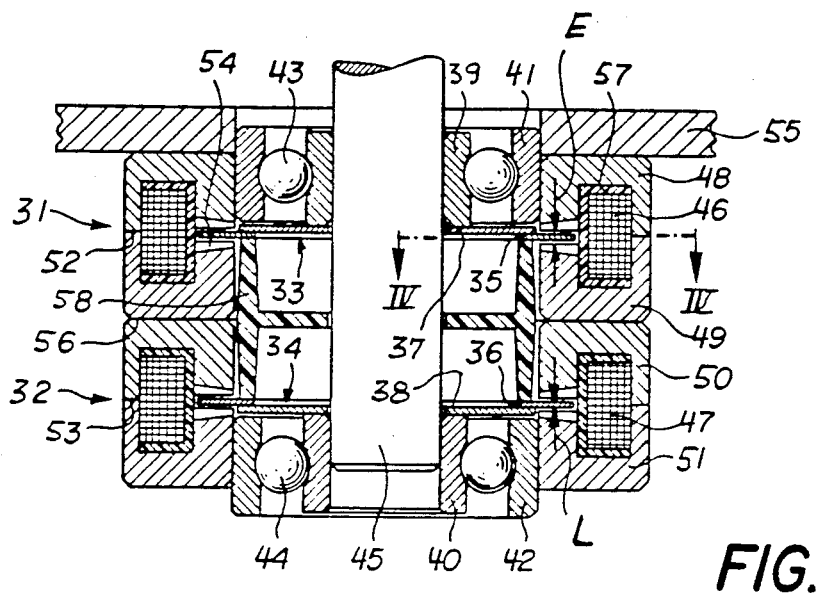
FIG. 3
FIG. 4
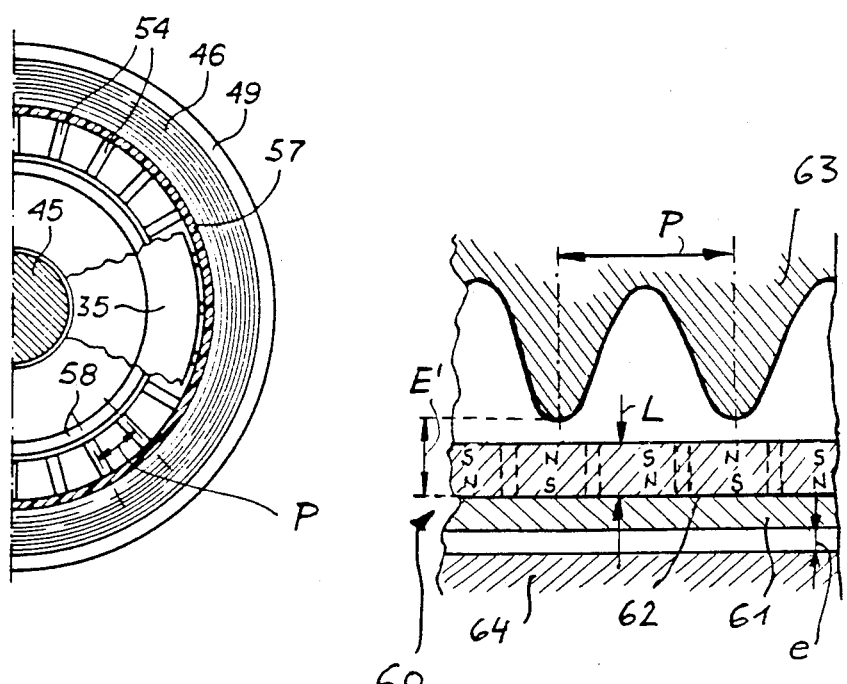
FIG. 5

ELECTRIC MOTOR WITH A MULTIPOLAR PERMANENT MAGNET ROTOR

BACKGROUND OF THE INVENTION

The present invention relates to electric motors and more particularly to motors of the type comprising a stator and a movable member with a multipolar permanent magnet arrangement.

The movable member of such a motor usually has two parallel substantially planar surfaces on which appear the magnetic poles of the permanent magnet arrangement, the thickness of which is substantially smaller than the dimensions of the movable member in the other directions. The magnetization is off a direction perpendicular to such parallel surfaces and perpendicular to the direction of movement of the member, each of the substantially planar surfaces exhibiting at least one series of magnetic poles of the same polarity. The stator of the motor comprises one or more magnetic circuits coupled with at least one electric energizing coil. The magnetic circuit or circuits comprise at least two polar parts facing each other and forming at least part of an air-gap in which the magnetic poles of the movable member are placed.

In known motors of this general type, the air-gap has been dimensioned on the basis of the following consideration. The Ampere-turns ni of the energizing coil are related to the magnetic field H created in the air-gap and to the air-gap width E by the relationship $ni = H \cdot E$. The value of ni is limited in particular by the necessary heat dissipation in the stator structure.

Accordingly, in order to increase the torque C delivered by the motor for a given value of ni it is necessary to increase the factor $\gamma$ appearing in the relationship $C = \gamma \cdot ni$ which represents the torque per Ampere-turn.

The obvious way to increase the torque per Ampere-turn was to increase the magnetic energy contained in the system and consequently the volume of the permanent magnet. The dimensions of the permanent magnet in the above-mentioned parallel surfaces are limited and determined by the size of the motor and the nubmer of poles required in the multipolar magnet arrangement. The remaining dimension is the one in the direction of the width of the air-gap. Thus, it seems appropriate to choose a relatively large value for the air-gap width E which allows the use of a corresponding relatively thick permanent magnet. This tendency was also supported by the fact that thicker magnets of rare earth materials are less fragile and by the generally good performances, particularly dynamic performances, of the motors of this type as compared to those of other motors of the same power or volume.

SUMMARY OF THE INVENTION

It has now been found that the usual approach does not lead to actually optimum performance of the motor, but unexpected small air-gaps and accordingly thin permanent magnets provide a maximum torque per Ampere-turn, as well as very good dynamic characteristics such as power rate and acceleration.

It is the main object of the present invention to provide an electric motor which delivers a high torque per Ampere-turn and presents a high power rate and acceleration of the movable member.

Thus, in accordance with invention, the minimum air-gap width is choosen in the range defined by the relationship $0.389\ P + 1.4 \leq P/E \leq 0.706\ P + 1.85$, P being the spacing of the centers of the magnetic poles of the same sign on the movable member and of the centers of regions of minimum width of the air-gap and E being the width of the air-gap, both being measured in millimeters. The thickness L of the permanent magnet optimally corresponds to width E, less the necessary mechanical clearance.

Furthermore, the following description of embodiments of the invention will show that the torque per Ampere -turn has a maximum within the above-mentioned range and that outside of this range the dynamic characteristics rapidly decrease.

The invention also applies to motors of the type wherein the movable member comprises a flat yoke part of magnetically permeable material on one side of the permanent magnet arrangement while the stator poles are facing the other side of the permanent magnet arrangement.

Throughout the present specification and claims the word "air-gap" does not define the actual air space of the magnetic circuits referred to, but instead refers to the space between opposite parts of permeable magnetic material and accordingly the entire space in which a permanent magnet is placed in the various embodiments. For example, in the embodiment where the movable member contains a yoke part as mentioned above, the air-gap extends between that yoke part and the opposite polar part of the stator. If, on the other hand, the permanent magnet is placed between two opposite polar parts of the stator, the air-gap extends between those opposite polar parts.

In a preferred embodiment, the polar part or polar parts placed on one side or on either side of the movable member comprise tooth-shaped portions with a square-shaped or trapezoidal profile in the direction of movement of the movable member. In that case, the minimum width E of the air-gap also has to satisfy the relationship $P/E < 3.6$.

In a preferred embodiment of the present invention, the motor comprises a flat annular disk mounted for rotation on a motor shaft, and the stator comprises a plurality of tooth-shaped polar portions facing other polar portions on either side of the annular disk in a direction parallel to the shaft of that disk. It may also be useful to increase the air-gap width slightly from the inner part to the outer part of such an annular disk, as will be set forth below.

BRIEF DESCRIPTION OF THE DRAWINGS

The invention, its objects and advantages will be better understood in light of the following description illustrated by the accompanying drawings, in FIG. 1 is a partial top view of the lower part of the stator of one embodiment of the motor of the invention, FIG. 3 is an axial sectional view of a two-phase synchronous motor having two stages, FIG. 4 is a sectional view along the line IV—IV of FIG. 3, FIG. 5 is a schematic view showing the definition of the minimum air-gap width in a motor wherein the rotor comprises a yoke part.

DESCRIPTION OF THE PREFERRED EMBODIMENT

Figure 1:
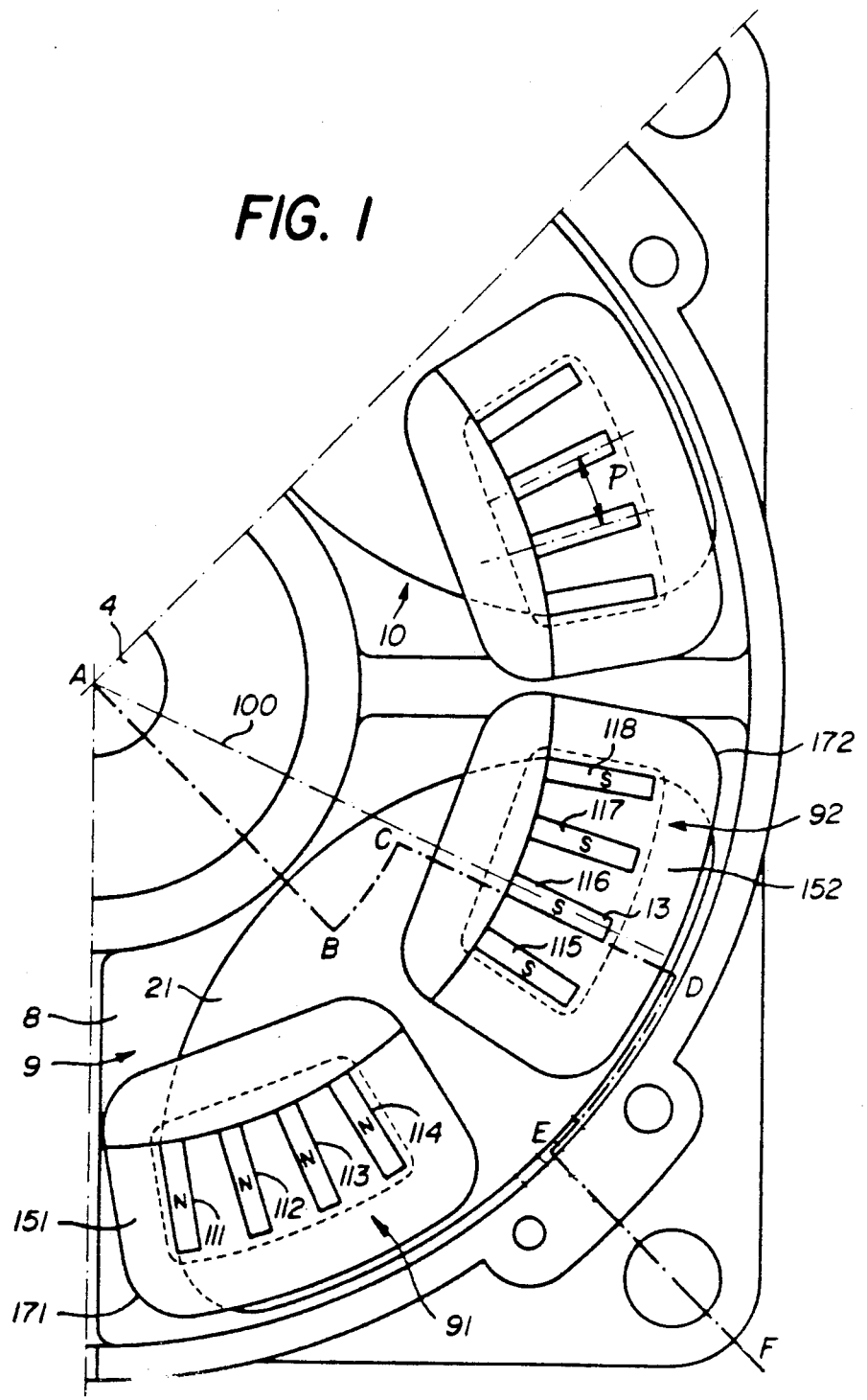
Figure 2:
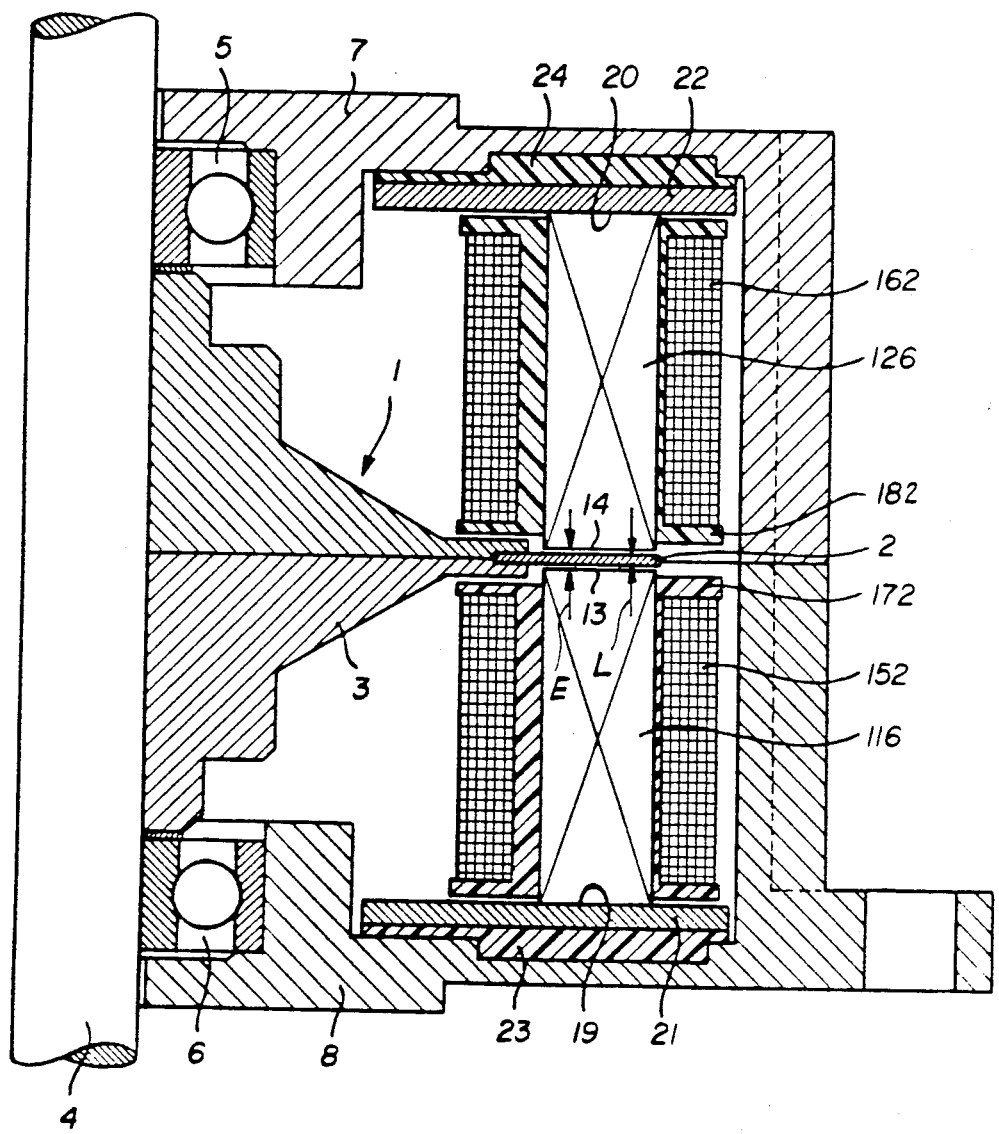
FIG. 2 is an axial sectional view of the motor partially represented in FIG. 1, along the broken line A-B-C-D-E-F.

FIGS. 1 and 2 show a typical motor of the type refered to in the background and is also described in U.S. Pat. No. 4,518,883 to Claude Oudet. The specific dimensioning rules according to the present invention can be advantageously applied to this kind of motor as will be explained below.

As described in U.S. Pat. No. 4,518,883, FIGS. 1 and 2 show a stepper motor with a rotary element 1 which comprises an annular disk 2 of a hard magnetic material and a supporting flange 3 of a non-magnetic material such as a light alloy or a plastic material. The rotary element 1 is mounted on a motor shaft 4 which is supported by two bearings 5, 6 fixed in a casing 7, 8 of the motor. The disk 2 is magnetized axially so as to present on each of its faces 2N magnetic poles of alternating polarity arranged regularly along the free annular zone of the disk, N being a natural number such as to 50 in the case of the motor of FIG. 1.

The stator of the motor accordings to FIGS. 1 and 2 comprises four magnetic stator circuits of the same shape, the lower part of one of these circuits 9 being entirely visible in FIG. 1, which shows one half of the lower part of a neighoring circuit 10.

Each stator circuit comprises a plurality of pairs of polar parts such as the pair 116, 126 of FIG. 2, the polar parts being formed by plates of magnetically permeable material or by an assembly of laminated sheets. The polar parts have an axial plane of symmetry designated by reference 100 in the case of polar part 116, and the free ends 13, 14 of one pair of polar parts such as 116, 126 form a narrow air gap in which the magnetized disk 2 moves. Generally, a plurality of pairs of polar parts, in the shown case four of them, form a group of polar parts, the polar parts placed on either side of the magnetized disk being respectively coupled with electric coils such as 152, 162. These coils are each supported by a coil body such as 172 and 182, these coil bodies also constituting a support for the corresponding polar parts.

Each stator circuit thus comprises a first and a second group of polar parts such as the groups 91, 92 represented in FIG. 1, in which the respective bottom polar parts of these groups, 111, 112, 113, 114 and 115, 116, 117, 118 can be seen. On either side of the magnetized disk the ends of the polar parts which are opposite to the ends forming the air gap, namely the ends 19, 20 shown in FIG. 2, are connected to each other by a respective yoke part formed of magnetically permeable material such as the yoke parts 21, 22.

In the preferred embodiment of the motor according to FIGS. 1 and 2, each stator circuit 9, 10, . . . comprises separate yokes which extend between the outer polar parts of the assembly of the two groups of each circuit, such as the polar parts 111 and 118 for circuit 9. The different yoke parts are fixed to the casing 7, 8 of the motor through corresponding fixing parts such as 23, 24, the coil bodies being fixed by conventional means to the corresponding yoke parts. FIG. 1 further shows the body 171 of the bottom coil 151 of group 91 and the body 172 of the bottom coil 152 of group 92.

A constructional variant using mechanically continuous yoke parts consists in providing saturable isthmuses between the various circuits, so as to substantially magnetically separate these circuits.

The axial planes of symmetry of the pairs of polar parts of a group form between each other an angle at least approximately equal to $2k\pi/N$, k being a natural number preferably equal to 1 which corresponds to a periodicity of like poles appearing on the faces of the magnetized disk of the rotative part. The respective axial planes of symmetry of a polar part of the first group of polar parts and of a polar part of the second group of the same circuit form between each other an angle at least approximately equal to $(2r+1)\pi/N$, where r is a natural number corresponding to an angular shift such that, for example, the polar parts of the first group 91 and the polar parts of the second group 92 co-operate respectively with different poles of of the magnetized disk for either side of the disk. In the case of FIG. 1, r takes a value from 1 to 4, depending on the considered polar parts of each group.

In each magnetic stator circuit the coils are energized so that the magnetic field produced in the axial direction of the motor is of opposite polarity for the two groups of pairs of polar parts. Thus, in the top view of the lower part of the stator shown in FIG. 1, the poles N and S appear as indicated on faces 13 of the polar parts of circuit 9. The magnetic field closes in each stator circuit through the two yoke parts, i.e., within planes which are parallel to that of the magnetized disk. This field is substantially contained within the two cylindrical annular space portions having as a base the magnetized part 2 and extending away on either side.

Another embodiment of a motor of the type to which the present invention applies is represented in FIGS. 3 and 4.

The motor shown in FIG. 3 is a two-stage motor, each stage of which comprises a respective stator portion 31, 32 and a corresponding rotatable member 33, 34. Each rotatable member comprises a respective rotor portion 35, 36 in the form of a thin, planar annular disk made from a magnetic material such as samarium- cobalt. These disks are magnetized parallel to their axis so as to present on each of their planar surfaces magnetic poles which are alternately North and South and which are distributed regularly along an annular zone of each surface. They are stuck or fixed in another adequate manner on a corresponding support part 37, 38, which is also in the form of an annular flat disk. In turn, the support disks are fixed, for example by welding, on the cheeks of respective internal races 39, 40 of two ball bearings. The corresponding external races or rings are respectively designated by 41 and 42, and the rows of balls of each of the bearings are designated by 43 and 44. The internal races of the two ball bearings are mounted on a shaft 45 of the motor, so as to be fast with this shaft in their definitive position determined at the time of assembly of the motor.

The two stator parts 31, 32 of the motor in FIG. 3 each comprise a corresponding electrical control coil 46 and 47 which is of annular form and is disposed coaxially relative to the axis of the motor. Each coil is coupled to a magnetic circuit comprising two annular parts which are respectively designated by 48, 49 and 50, 51. These annular parts are made of a material having very good magnetic permeability, and they are in contact in pairs along peripheral planar contact zones 52 and 53 in such a way that the magnetic resistance also remains low in this region. On the other hand, the parts 48 to 51 each have an interior annular part comprising a series of teeth, such as 54, which are distributed over the entire circumference in such a manner as to form in each of the stator parts an annular air-gap which is variable along this surface. As shown in FIG. 3, the axial section of the magnetic circuits thus has the shape of a C, and an annular zone of each part of the rotor is disposed in the respective air gap formed by these magnetic circuits.

In the motor of FIG. 3, the external parts 48 and 51 of the magnetic circuits are mounted on the corresponding external rings or races 41 and 42 of the ball bearings of the motor. A support plate 55 is likewise fixed on a part of the external cylindrical surface of the ring 41 of one of the ball bearings.

The internal parts 49 and 50 of the two stator portions 31 and 32 are in contact along an annular cylindrical surface 56 perpendicular to the axis of the motor. In accordance with a modified constructional form, an intermediate element having planar parallel surfaces could be disposed between the parts or portions 49 and 50 so that they would be spaced apart while maintaining the parallel relationship of their planar annular surfaces, such as the surface 56.

In FIG. 3, there are further shown coil body parts 57 in which the control coils are fitted, and a separator 58 made of plastic material which may be disposed between the two parts of the rotor in order to facilitate the assembling of the motor.

FIG. 4 shows the configuration of certain elements of the motor as a section along the line IV—IV of FIG. 3. As shown, the teeth 54 are radially orientated and are arranged regularly along the internal periphery of the visible annular part 49.

In the embodiments of motors described above in connection with FIGS. 1 to 4, the air-gap in which the multipolar permanent magnet arrangement is placed is formed between two series of teeth of substantially rectangular shape, the teeth being arranged on either side of the movable member so as to face each other. The spacing of consecutive teeth of a group associated with the same phase, measured along a circle through the centers of the teeth is, at least approximately (i.e., except for possible shiftings for harmonic cancellation) equal to P, which is the pole pitch on the movable member (i.e. the distance between magnetic poles of the same name measured along a circle through the centers of the magnetic poles). The axial distance E between opposite polar surfaces represents the minimum width of the air-gap of the motor. This air-gap is variable along the path of movement of a point of the movable member (i.e. a circle in the case of a rotor), the variation being in the embodiment of FIGS. 1 and 2 a variation between E and a theoretically infinite value in the space between the separate polar parts. In FIGS. 3 and 4, on the other hand, the variation is between E and a limited larger value between consecutive teeth.

The thickness of the permanent magnets placed in the air-gap has been designated in all embodiments to be defined by L.

FIG. 5 shows schematically an alternative arrangement in which a movable member 60 comprises a yoke part 61 of high magnetic permeability which is bound to or integral with a permanent magnet arrangement 62 similar to one of the preceding examples of FIGS. 1-4. In the embodiment of FIG. 5 the stator comprises one toothed stator part 63 disposed on one side of the magnet arrangement, namely on the side opposite to the one which is connected to the yoke part 61, and another stator part 64 disposed opposite the yoke part and spaced therefrom by a distance e corresponding at least to the necessary mechanical clearance. The permanent magnet arrangement 62 has a thickness L.

The air-gap is defined in FIG. 5 as the space between the opposite surfaces of stator part 63 and yoke part 61. Stator part 63 shows, by way of example, rounded teeth forming poles spaced from each other by P. In addition the shape of the polar portions or of the stator parts can be changed to another example or may be shaped as in any of the preceding examples, provided of course that the stator structure is adapted accordingly. The minimum air-gap width in the case of a dissymmetric arrangement such as that illustrated in FIG. 5 is designated by E'.

According to the invention, the minimum air-gap width E or E' has to satisfy the following respective relationship:

$$0.385\,P + 1.4 \leq P/E \leq 0.706\,P + 1.85$$

$$0.385\,P + 1.4 \leq P/2E' \leq 0.706\,P + 1.85$$

wherein P and E or E' are measured in mm along or on the mean path of movement of the rotor. Since in a rotary device the actual pole pitch length will increase with increasing diameter of the rotor, this may be compensated by also increasing the minimum air-gap width E or E' in the radial direction, in order to maintain P/E at a given constant value. However, since the pole pitch is generally determined by the radial size of the motor and its specific use, the actual variable for the dimensioning of the motor is E or E'.

Figure 6:
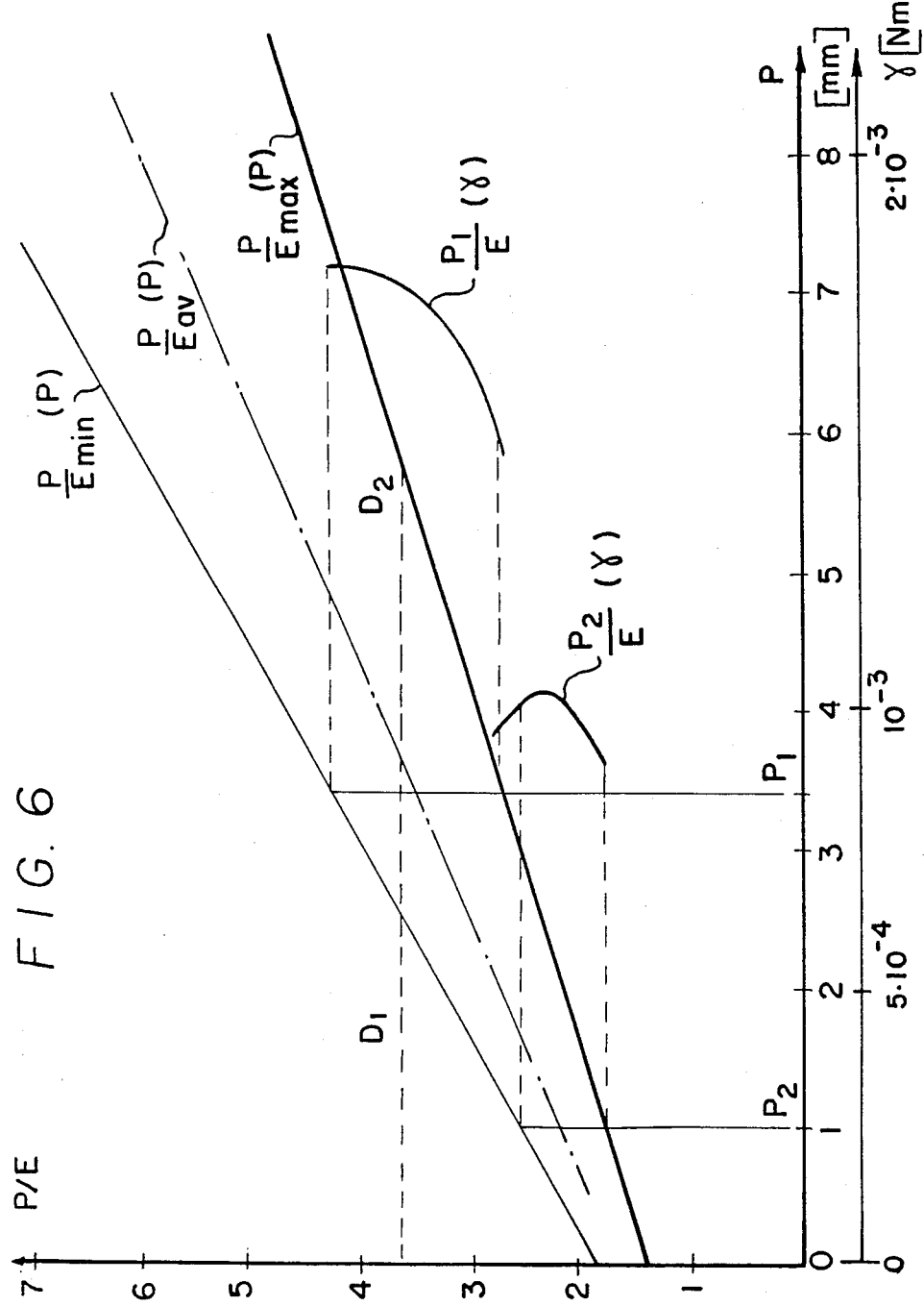
FIG. 6 is a graph showing the range of P/E, i.e., the pole pitch/air-gap width according to the invention as a function of P and the variation of γ as a function of E in the respective ranges for two different motor types.

FIG. 6 is a graph showing in particular the range of P/E as a function of P. The limits of the P/E range according to the invention are indicated by the straight line $P/E_{min}$ and $P/E_{max}$, the average or preferred air-gap minimum width $E_{av}$ corresponding to the dotted line $P/E_{av}$.

FIG. 6 also illustrates the case of two examples of motor structures having respectively mean pole pitch $P_1$ and $P_2$, the motor with pole pitches $P_1$ having a structure as illustrated in FIGS. 1 and 2 and the motor with $P_2$ having a structure according to FIGS. 3 and 4. In these two cases, FIG. 6 shows the variation of the torque per Ampere-turn $\gamma$ in Nm/At representated on the abscissa as a function of P/E (i.e. $P_1/E$ and $P_2/E$), respectively. It is apparent from that variation, that the torque rapidly decreases beyond the limit corresponding to $E_{max}$, although it could be expected that the torque would increase with increasing E and a corresponding magnet thickness L.

The dynamic characteristics of the motor such as power rate and acceleration of the rotor appear to decrease rapidly outside the optimum range of the invention; therefore, that range actually represents a rather critical unexpected limitation of the dimensioning of the present type of motors.

I claim:

1. An electric motor comprising a stator and a movable member with a multipolar permanent magnet formed of a magnetic material having a substantially linear demagnetization characteristic in the field of use of said multipolar permanent magnet, said movable member having two parallel, substantially planar surfaces on which appear the magnetic poles of said permanent magnet, said planar surfaces being spaced apart by a distance L representing the thickness of the permanent magnet, wherein the thickness L is substantially smaller than the diameter of said parallel surfaces, the direction of magnetization being perpendicular to said surfaces, and said permanent magnet having on each of said substantially planar surfaces at least one series of magnetic poles of the same polarity, the centers of said magnetic poles being spaced apart from each other by a length P measured along the path of their movement, the stator of the motor comprising at least one magnetic circuit coupled with at least one electric energizing coil, said circuit comprising at least two polar parts facing each other and forming part of an air-gap in which said magnetic poles of said permanent magnet are placed, the width of the air-gap varying along the direction of movement of said movable member and having a minimum value E, the centers of the regions of minimum width of the air-gap being spaced along the direction of movement of said movable member at least approximately by said length P, wherein said minimum air-gap width E satisfies the relationship $0.385\,P+1.4 \leq P/E \leq 0.706\,P+1.85$, P and E being measured in mm, while said thickness L of the permanent magnet corresponds to E less the necessary mechanical clearance.

2. An electric motor comprising a stator and a movable member with a multipolar permanent magnet formed of a magnetic material having a substantially linear demagnetization characteristic in the field of use of said multipolar permanent magnet, said movable member having two parallel, substantially planar surfaces on a first one of which appears the magnetic poles of said permanent magnet, said planar surfaces being spaced apart by a distance L substantially smaller than the diameter of said parallel surfaces, the direction of magnetization being perpendicular to said surfaces, and said permanent magnet having on said first one of said planar surfaces at least one series of magnetic poles of one polarity, the centers of said magnetic poles being spaced apart from each other by a length P measured along the path of their movement, said movable member comprising a flat yoke part of magnetically permeable material having a substantially constant thickness and forming the second of said substantially planar surfaces, the stator of the motor comprising at least one magnetic circuit coupled with at least one electric energizing coil, said circuit comprising at least one polar part facing said first substantially planar surface of the movable member and defining with said yoke part part of an air-gap having a width that varies along the direction of movement of said movable member and has a minimum value E', the regions where said minimum values occur being spaced along the direction of movement of said movable member at least approximately by said length P, wherein said minimum value E' satisfies the relationship $0.385\,P+1.4 \leq P/2E' \leq 0.706\,P+1.85$, P and E' being measured in mm.

3. An electric motor as claimed in claim 1, wherein each polar part placed on one side of the movable member comprises one or more tooth-shaped portions with a square-shaped or trapezoidal profile in the direction of movement of the movable member, the width E satisfying the relationship $P/E < 3.6$.

4. An electric motor as claimed in claim 2, wherein said polar part comprises one or more tooth-shaped portions with a square-shaped or trapezoidal profile in the direction of movement of the movable member, the value E' satisfying the relationship $2\,P/E' < 3.6$.

5. An electric motor as claimed in claim 1 or 3, wherein said movable member comprises a flat annular disk mounted for rotation on a motor shaft, said stator comprising a plurality of tooth-shaped polar portions extending so as to face either side of the annular disk in a direction parallel to the axis of rotation of said disk.

6. An electric motor as claimed in claim 5, wherein said air-gap width E increases slightly from the inner to the outer part of said annular disk.

* * * * *